United States Patent [19]
Hooper et al.

[11] Patent Number: 6,040,397
[45] Date of Patent: Mar. 21, 2000

[54] EXTREMELY LOW VISCOSITY MATRIX EPOXY SUFFUSION RESIN SYSTEM

[75] Inventors: James R. Hooper, Palmdale; Richard K. Strother, Valencia; John Fish, Canyon Country; Paul G. Pawling, Corona; Gerald L. Sauer, Anaheim, all of Calif.

[73] Assignee: Lockheed Martin Corporation, Palmdale, Calif.

[21] Appl. No.: 09/110,168

[22] Filed: Jul. 6, 1998

Related U.S. Application Data

[63] Continuation-in-part of application No. 08/969,356, Nov. 28, 1997, abandoned.
[51] Int. Cl.$^7$ ................................................ C08F 283/10
[52] U.S. Cl. ..................... 525/526; 264/553; 264/571; 428/413; 525/523; 525/525; 528/112
[58] Field of Search ...................... 525/523, 525, 525/526; 428/413; 528/112; 264/553, 571

[56] References Cited

U.S. PATENT DOCUMENTS

| | | | |
|---|---|---|---|
| 3,974,113 | 8/1976 | Sassano et al. ...................... | 528/112 X |
| 4,069,192 | 1/1978 | Monte et al. . | |
| 5,612,424 | 3/1997 | Sato et al. ............................... | 525/530 |
| 5,707,571 | 1/1998 | Reedy ..................................... | 264/45.3 |
| 5,872,196 | 2/1999 | Murata et al. .......................... | 525/508 |

*Primary Examiner*—Robert Dawson
*Assistant Examiner*—Jeffrey B. Robertson
*Attorney, Agent, or Firm*—Robert A. Schruhl

[57] ABSTRACT

A single component, extremely low viscosity, pre-catalyzed high functionality diepoxide and epoxy resin system has been developed. This resin system has good thermal stability, an extended work life and is capable of being refrigerated to −18 C. and stored for extended periods of time with little or no change in physical or mechanical properties. The resin system has direct applications in a number of industries including, but not limited to, the aircraft and spacecraft industries. The resin system is a mixture of specific epoxy resins and curing agents that when combined form an extremely low viscosity resinous system that may be readily cured at a temperature as low as 52 degrees C. into novel thermoset materials prepared therefrom, which are characterized by superior strength properties and methods for preparing the same.

23 Claims, 7 Drawing Sheets

TABLE I

Viscosity and epxide equivalent weight (EEW) of selected quantities of A Polymeric epoxy resin (a solid epoxy resin) diluted in 100 parts by weight of a cycloaliphatic epoxide.

| Mix No. | PBW EPOXY* | Solubility | Viscosity cps @ 25°C | EEW WGT. | Notes |
|---|---|---|---|---|---|
| 1 | 10 | ok | 11 | 77 | #1 through 9 |
| 2 | 20 | ok | 20 | 81 | room temperature soluble with |
| 3 | 35 | ok | 45 | 87 | minor stirring---- |
| 4 | 40 | ok | 68 | 89 | |
| 5 | 45 | rm. tmp. | 90 | 91 | |
| 6 | 50 | ok | 119 | 93 | |
| 7 | 55 | ok | 145 | 95 | |
| 8 | 60 | ok | 192 | 97 | |
| 9 | 65 | ok | 228 | 98 | |
| 10 | 80 | 125°F | 350 | 103 | #10 through #17 require |
| 11 | 90 | 125°F | 470 | 106 | moderate stirring at room |
| 12 | 100 | 125°F | 750 | 109 | temperature. Solutions heated |
| 13 | 110 | 125°F | 1125 | 112 | to 125°F expedites the air |
| 14 | 115 | 125°F | 1422 | 113 | release. |
| 15 | 125 | 125°F | 2119 | 116 | |
| 16 | 135 | 125°F | 3035 | 118 | |
| 17 | 140 | 125°F | 3590 | 119 | #18 through #26 require |
| 18 | 150 | 175°F | 5170 | 122 | constant stirring and heat as |
| 19 | 160 | 175°F | 8100 | 124 | indicated. All held at |
| 20 | 170 | 175°F | -- | 126 | temperature until free of |
| 21 | 180 | 175°F | -- | 128 | trapped air. |
| 22 | 190 | 175°F | -- | 130 | |
| 23 | 200 | 175°F | -- | 131 | |
| 24 | 400 | 225°F | -- | 158 | |
| 25 | 600 | 225°F | -- | 173 | |
| 26 | 800 | 225°F | -- | 182 | |

VERY LOW VISCOSITY MATRIX EPOXY SUFFUSION RESIN SYSTEM FORMULA

| COMMON NAME | SPECIFIC CHEMICAL NAME | WORKING RANGE PARTS BY WEIGHT |
|---|---|---|
| DIEPOXIDE | CYCLOALPHATIC EPOXIDE | 5-80 |
| POLYMERIC EPOXY RESIN | BISPHENOL A/NOVOLAC EPOXY RESIN | 2-45 |
| AROMATIC POLY EPOXIDE | METHYLENE BIS (O-ETHYLANILINE) TETRAGLYCIDYL ETHER | 5-30 |
| CHAIN EXTENDED EPOXIDE RESIN | OXIRANE, 2, 2'-{(1-METHYLETHYLIDENE) BIS {4, 1-PHENYLENEOXY {1- (BUTOXYMETHYL) -2, 1-ETHANEDIYL} OXYMETHYLENE}} BIS- | 2-20 |
| EPOXIDE RESIN | PHENOL, 4, 4'- (1-METHYLETHYLIDENE) BIS-, POLYMER WITH (CHLOROMETHYL) OXIRANE | 15-60 |
| ANHYDRIDE | METHYL HEXAHYDRO PHTHALIC ANHYDIRIDE | 35-180 |
| IMIDIZOL | 2-ETHYL-4-METHYLIMIDAZOLE | 0.001-0.6 |
| NEOALKOXY | DINEOPENTYL(DIALLY)OXY, DIPARAMINO BENZOYL ZIRCONATE | 0.001-0.2 |

TABLE II

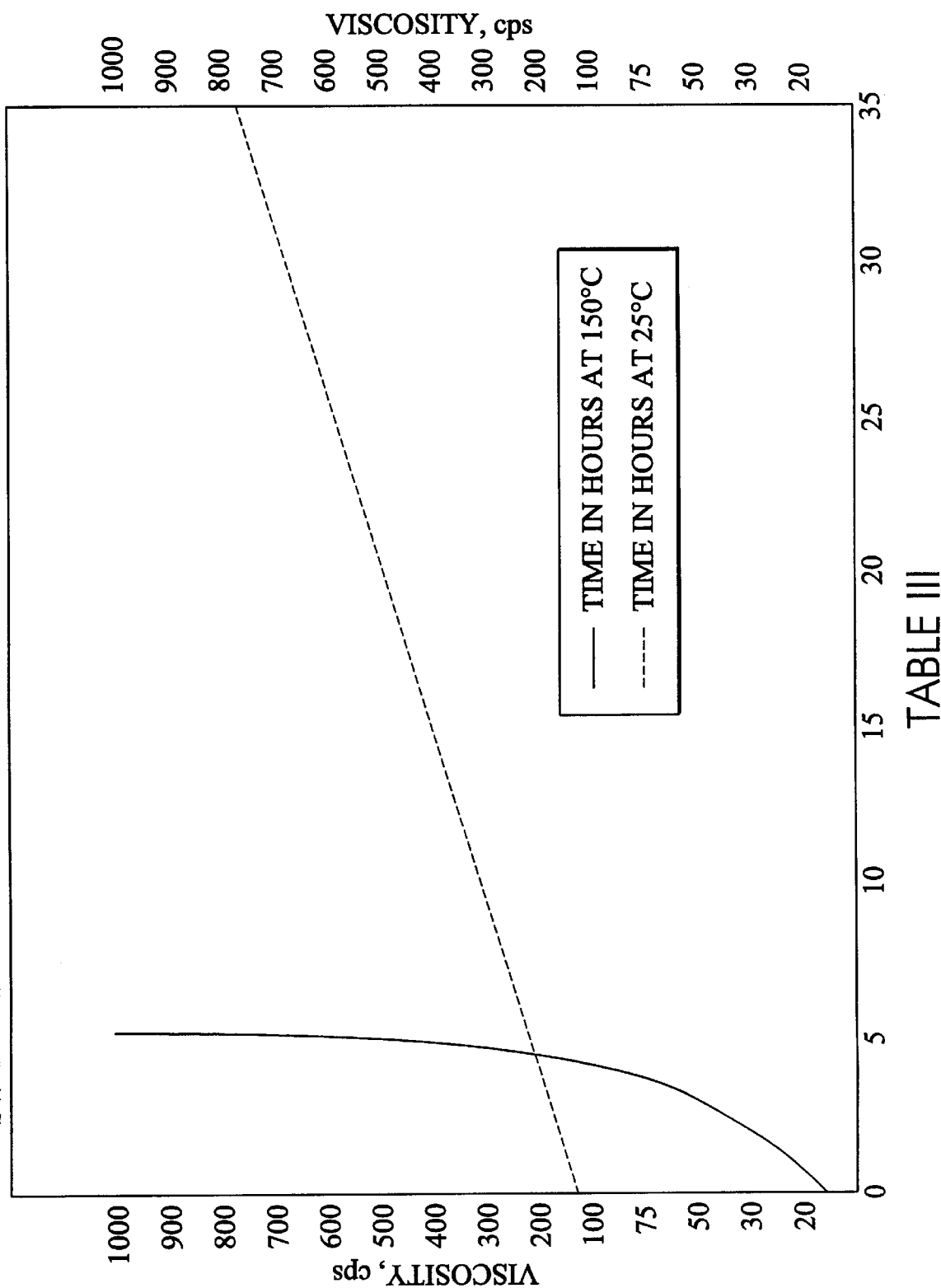

TABLE IV

"SUFFUSION RESIN" PROPERTIES

PHYSICAL PROPERTIES – NEAT RESIN

| PROPERTY | VALUE |
|---|---|
| Viscosity @ 25°C., cps | <200 |
| Specific Gravity | 1.2 |
| Flash Point, ccc - °C. | >94 |
| Vapor Pressure @ 20°C., mm Hg | 0.1 |
| Boiling Point @ 760 mm Hg °C. | >200 |
| Color 1933 Gardner, Max | 2 |
| Freezing Point °C. | -50 |

MECHANICAL PROPERTIES – NEAT RESIN

| PROPERTY | VALUE |
|---|---|
| Flexural – Ultimate, psi | 18,500 |
| Flexural Modulus | 0.480 |
| Tensile – Ultimate, psi | 10,300 |
| Tensile Modulus | 0.440 |
| Compression – Ultimate, psi | 17,930 |
| Compression Modulus | 0.521 |
| Tg, °F., DSC, Dry | >350 |
| Hardness, shore D | >86 |
| Glass Transition, Tg, °F., DMA, Wet | >300 |

1

TABLE IV

MECHANICAL PROPERTIES OF CARBON LAMINATE 6K, 5H, AS4, WOVEN FABRIC

| PROPERTY | TEST METHOD | VALUE |
| --- | --- | --- |
| Tensile, Ultimate | ASTM D638 | 111,600 |
| Tensile Modulus | ASTM D638 | 10.5 |
| Compression, Ultimate | ASTM D695 | 88,450 |
| Compression Modulus | ASTM D695 | 12.0 |
| Flexural, Ultimate | ASTM D790 | 92,725 |
| Flexural Modulus | ASTM D790 | 8.32 |
| Fracture Toughness | (GIIc) | 9 in. lb/in$^2$ |

NOTES:

| | |
| --- | --- |
| Fiber Volume, Actual | 52% |
| Mechanical data fiber volume Fraction normalized to | 60% |

TABLE IV

MECHANICAL PROPERTIES OF UNI-DIRECTIONAL 6K, AS4 CARBON FIBER LAMINATE

| PROPERTY | TEST METHOD | VALUE |
|---|---|---|
| Tensile, Ultimate, psi | ASTM D3039 | 259,495 |
| Tensile Modulus, msi | ASTM D3039 | 20.25 |
| Compression, Ultimate | ASTM D695 | 123,760 |
| Compression, msi | ASTM D695 | 14.35 |
| Flexural, Ultimate, psi * | ASTM D790 | 170,950 |
| Flexural Modulus, psi | ASTM D790 | 16.22 |

NOTE: NO ILS SPECIMENS WERE TAKEN FROM THIS PANEL DUE TO THE HEAVY STITCHING USED TO HOLD THE UNIDIRECTIONAL 16K CARBON STRANDS IN PLACE.

* REVISED TO INCLUDE FLEXURAL PROPERTIES., 11-19-97. pgp

EXTREMELY LOW VISCOSITY MATRIX EPOXY SUFFUSION RESIN SYSTEM

CROSS-REFERENCE TO RELATED APPLICATIONS

This application is a continuation-in-part of parent application Ser. No. 08/969,356, filed Nov. 28, 1997, now abandoned.

BACKGROUND OF THE INVENTION

Field of the invention

The present invention relates to an extremely low viscosity matrix epoxy resin system, more particularly this invention relates to a single component, extremely low viscosity, pre-catalyzed, high functionality diepoxide and epoxy resin system capable of being refrigerated and stored for extended periods of time with little or no change in ensuing physical or mechanical properties. Additionally, the present invention relates to an extremely low viscosity, high functionality resin system for suffusing into fibrous pre-forms to fabricate high strength, complex composite structures.

The cured epoxy resin system of this invention has excellent cold, hot, wet and mechanical, cohesive and adhesive properties. Epoxy resins, such as the suffusion resin system of this invention, have application throughout many industries. Typical examples of such industries are automotive, electronic, research, defense, medical and aerospace. In such industries the advancement of the art, especially that of aerospace and spacecraft composite structures development, is an on going process. Subsequently, it is widely known that many spin-off applications for lightweight and strong composite structures exist. An example of such an application is the government's involvement in the development of lightweight crash resistant rapid transit systems, earthquake resistant structures and orbital space structures.

Epoxy resins are resinous materials known to be valuable as the principle component in matrix systems, such as those involving high strength fibrous reinforcements.

When used as a matrix epoxy resin system it is generally necessary to add a curing mechanism in order to obtain polymerization. When a room temperature reactive curing agent is added to the resin, polymerization usually takes place at room temperature without the addition of external heating. Curing agents that react at room temperature tend to increase the resin viscosity from the moment of compounding so that in a short while the resin becomes too viscous to permeate either woven fabrics or unidirectional filaments. As the viscosity increases, the complete exclusion of air below the maximum allowable void content of 2 percent is difficult to nearly impossible to obtain. Most often the resin begins to polymerize before it can be properly utilized. For example, resin drawn into a fibrous matrix by vacuum often becomes too viscous to permeate the small interstices between fibers. Thus, it has become apparent that a need exists for a novel extremely low viscosity resin system with extended work and shelf life stability, that is cost effective and that eliminates the need for constitution before use.

When latent curing agents are added to a state of the art matrix epoxy resin system, polymerization does not take place at room temperature. A completely cured resin composition must be obtained by heating. While induced heat reduces the matrix epoxy resin system viscosity, often the viscosity is such at the outset that trapped air, common to all pre-impregnated resin and fiber compositions is not readily removed except by utilizing special and expensive processing methods. Complete processing often requires a special clean room lay up and vacuum bagging followed by autoclave or oven cure.

Epoxy pre-impregnated fiberglass and carbon fiber are typical examples of materials used to fabricate aerospace composite structures. Existing technology requires that these materials be arranged in a predetermined pattern on a expensive mold whose form controls their shape and size. Further the epoxy lay-up often must be sealed in a vacuum bag and heat cured in an oven or autoclave using vacuum as the principle means of evacuating air from the pre-impregnated lay-up. Thus thick lay-ups and complex shapes often must be cured using an autoclave that involves heat, vacuum and pressure up to 300 psi.

Alternative methods are injection molding and compression molding, both of which require considerable capital investment and complex tooling while precluding the use of continuous fiber reinforcements. State of the art composite fabrication methods, in general, involve long learning curves, costly materials, expensive labor and processing equipment.

Another process commonly referred to as RTM (resin transfer molding) often involves complex tooling, manufactured using 5 axis CNC machining or EDM (electrical discharge machining). The manufacturing process involves the pressure injection of a liquid resin into a pre-form of fibers that are contained in a closed and sealed RTM split mold. Most often, the RTM process requires the use of heat to reduce the viscosity of the currently available resins that are capable of producing acceptable performance properties while utilizing RTM technology. Cure commonly takes place in an oven, autoclave or by induction heating. RTM and EDM tooling methods involve high technology engineering that is not conducive to either limited production quantities or cost effective manufacturing.

In addition to the above, there is yet a very important expeditious process known to the trade as VARTM (vacuum assist resin transfer molding). The VARTM process employs adequate, yet very low cost molds upon the surface of which raw fiber lay-ups or prepared fiber pre-forms are placed. The lay-up and the mold are then either placed in a vacuum bag or the lay-up is contained on the mold surface by a vacuum film that is attached to the surface of the tool in such a manner that all air, on a practical basis, is evacuated. At this point resin is allowed to suffuse into the fiber. When the fiber is completely impregnated, closing the resin inlet while allowing the vacuum to exert the required negative pressure on the now impregnated lay-up terminates the resin suffusion. Cure occurs when either heat or time, or both, advances polymerization to a selected end point. Initial polymerization is followed by, for example, a "free standing" oven post cure that provides aircraft quality mechanical properties. "Free standing", means, for example, that a composite structure, after suffusion and initial cure, may be subjected to a final cure (to develop maximum properties) without mechanical support.

Yet another process commonly known as "filament winding" may utilize the product of this invention either by established filament winding methods or by utilizing aforementioned suffusion methods on a dry pre-wound form.

The present invention addresses the inherent limitations of current technologies by providing a low viscosity epoxy resin system that readily saturates, for example, but not limited to, woven fiberglass and carbon fabrics, unidirectional fiberglass and carbon tapes by both a suffusion and wicking action. These unique features are not available with any other resin system, especially at the use temperature of 20 to 25° C.

More specifically the present invention provides for a one component, pre-catalyzed resin system that requires no vacuum degassing, weighing or mixing of ingredients. Additionally, the present invention provides a resin that is transparent which allows for visual and foreign matter monitoring of resin during usage. The ingredients of this invention when combined, provide a low order of toxicity, and an extremely long work life.

SUMMARY OF THE INVENTION

It is an objective of the present invention to provide a novel epoxy resin system.

It is another object of the present invention to provide a low viscosity epoxy resin system and a process for its preparation.

It is yet another object of the present invention to provide a single component, extremely low viscosity, pre-catalyzed, high functionality diepoxide and epoxy resin system capable of being refrigerated for long term storage.

It is yet another object of the present invention to provide a low viscosity resin system which readily saturates fibrous or other matrix reinforcements by both suffusion and wicking action at the use temperature of 20–25° C.

It is a yet another objective of the present invention to provide a novel curing composition that has a useable work life of greater than 16 hours @ 20° C.

It is a further objective of the present invention to provide a one component suffusion resin and curing mechanism that is readily cured to handling properties at moderate temperatures as low as 55° C.

It is yet a further objective of the present invention to provide a heat resistant resin system having improved impact strength, toughness, mechanical strength and electrical insulation properties.

It is yet still another objective of the present invention to provide an epoxy resin system capable of being cured in thick and large area sections with little or no exotherm.

Figure 1:
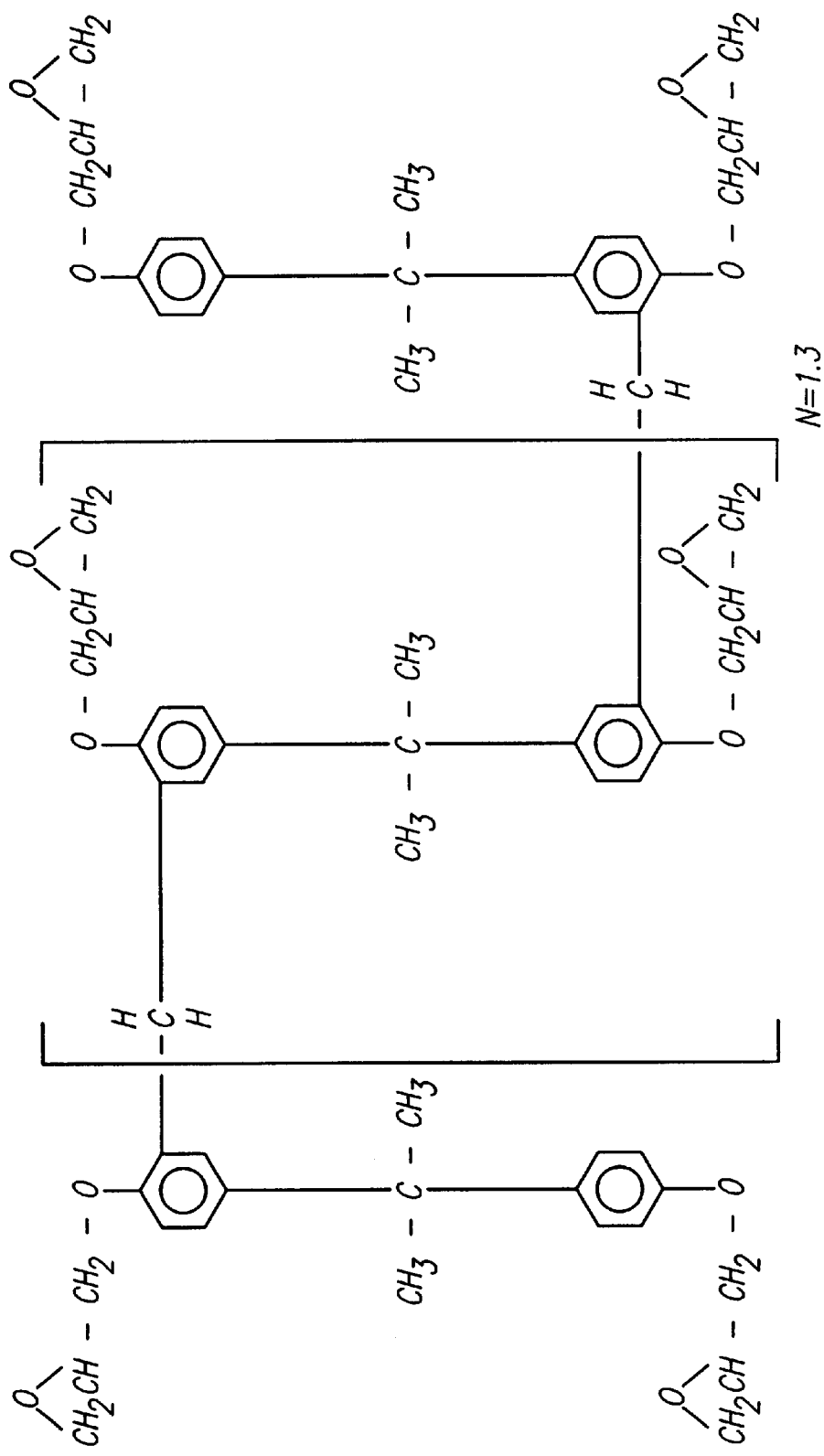
FIG. 1 is the chemical formula for phenol-formaldehyde novolac resin SU-8, a high functionality solid polymeric epoxy resin.

Tables I–IV are properties of the present invention.

DETAILED DESCRIPTION OF THE PREFERRED EMBODIMENTS OF THE INVENTION

According to the present invention there is provided a pre-catalyzed one component epoxy resin system comprised of a suffusion resin composition having a theoretical epoxide equivalent weight (EEW) in the range of about 150 to about 350 and an anhydride curing agent or mechanism having an approximate anhydride equivalent weight of about 120 to about 350.

When the suffusion composition of the present invention is combined with the curing agent using a mix ratio of about 100 parts by weight of resin with about 45 to 140 parts by weight of curing agent to which has been added about 0.001 to 6.5% by weight of an imidazole accelerator, and about 0.001 to 0.02 parts by weight of a coupling agent or substrate adhesion promoter the stable, the novel suffusion resin of the present invention is produced. This resin has a viscosity which may be selectively adjusted to fall between about 50 cps and about 500 cps at about 22° C., Ref. Table I.

According to the present invention, there is further provided a unique suffusion resin system comprised of a high functionality solid resin and certain liquid resins combined with a diepoxide resin, as illustrated in Table II. When the high functionality solid resin, polymeric epoxy resin, is dissolved into the diepoxide a multifunctional resin system is created having universal compatibility with other standard epoxy resins.

The suffusion resin system of the present invention is further characterized as being the combination of a bisphenol A/novolac epoxy resin with a cycloaliphatic epoxide, in combination with an aromatic poly epoxide, a chain extended difunctional epoxide resin, a diglycidyl ether, a curing agent, an accelerator and a coupling agent, sometimes referred to as substrate adhesion promoter, as illustrated in Table II.

For the purpose of this invention, an epoxy is defined as any molecule containing more than one α or 1,2-epoxy group which is designated by the structural formula

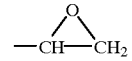

and subsequently capable of being converted to useful thermoset form. The term multifunctional resin is used herein to indicate both the uncured and cured state of the polymeric epoxy resin when dissolved into the diepoxide resin in any proportion, but not limited to those identified in Table 1. A unique and novel multifunctional cyclopolymeric epoxide resin system is created that has universal and beneficial compatibility with all standard epoxy resins.

The procedure for formulating the extremely low viscosity matrix epoxy suffusion resin system of the present invention comprises the steps of formulating a suffusion resin having a theoretical epoxide equivalent weight (EEW) in the range of 150 to 350 and an anhydride curing mechanism having an approximate anhydride equivalent of about 120 to 350.

When the suffusion resin is combined with the curing agent using a mix ratio of about 100 parts by weight of resin with about 45 to 140 parts by weight of curing agent to which has been added about 0.001 to 6.5% by weight of an imidazole accelerator, and about 0.001 to 0.02% by weight of a coupling agent or substrate adhesion promoter it forms the stable novel suffusion resin of this invention. The viscosity of this suffusion resin may be selectively adjusted to fall between 50 cps and about 500 cps at about 22° C.

In a preferred embodiment of the present invention a high functionality solid polymeric epoxy resin, SU-8, as illustrated in FIG. 1, manufactured by the Shell Oil Company, is combined with a liquid cycloaliphatic resin, preferably a cycloaliphatic diepoxide, manufactured by the Union Carbide Corporation under the chemical name vinyl cyclohexene dioxide, creating the novel multifunctional cyclopolymeric epoxide resin of the present invention. Physical property parameters of this cyclopolymeric epoxide resin are shown in Table 1.

To this multifunctional cyclopolymeric epoxide resin is combined an aromatic polyepoxide resin, preferably methylene bis (O-ethylanaline) tetraglycidyl ether, which is manufactured by the Ciba Giegy Corporation, with the resultant product being a mixed resin blend 1.

A chain extended epoxide resin, preferably Oxirane, 2,2'-{(1-Methylethylidene) Bis {4,1-phenyleneoxy {1-

(Butoxymethyl)-2,1-Ethanediyl} Oxymethylene}} Bis, manufactured by the Ciba Giegy Corporation, is combined with mixed resin blend 1 yielding mixed resin blend 2.

Phenol, 4,4'-(1-methylethylidene) Bis-, polymer with (chloromethyl) Oxirane, manufactured by the Ciba Giegy Corporation, is combined with mixed resin 2 yielding mixed resin 3.

To mixed resin 3 is combined an anhydride (curing agent), preferably methyl hexahyrophthalic anhydride manufactured by Dixie Chemical Corporation, and others, to yield mixed resin 4.

Mixed resin 4 is combined with an imidazole (accelerator), preferably 2-ethyl-4-metylimidazole (EMI-24) to yield mixed resin 5.

Finally, to mixed resin 5 a Neoalkoxy is combined, preferably Dineopentyl(dially)oxy diparamino benzoyl zirconate (NZ-37), manufactured by Kenrich Petrochemicals, Inc. Table II, lists these preferred compositional components and their concentration ranges.

The preferred cycloaliphatic diepoxide compositional component of the present invention is vinyl cyclohexene dioxide, chemical formula $C_8$—$H_{12}$—$O_2$ It is within the contemplation of the present invention that certain cycloaliphatic epoxides may theoretically be usable as a substitute for vinyl cyclohexene dioxide, such as, 3,4-Epoxycyclohexylmethyl 3,4-Epoxy-cyclohexane carboxylate, a product of Union Carbide Chemicals and plastics, Inc.

The Phenol-formaldehyde novolac solid resin, SU-8, is the preferred high functionality solid resin of the present invention. SU-8 has an epoxide equivalent weight of 225, a melt point of 90 degrees or higher and eight reactive sites per molecule. It is within the contemplation of the present invention that additional high functionality solid resins that possess these physical and chemical properties, i.e., have a melt point of 90 to 100° C., have a weight per epoxide of 225 or greater and have at least eight reactive sites per molecule may be usable in the present invention.

Methylene bis (O-ethylaniline)tetraglycidyl ether is the preferred aromatic polyepoxide resin of the present invention. It is within the contemplation of the present invention that additional polyepoxide resins that have the following properties are usable: a viscosity of between 8,000 and 10,000 cps and a weight per epoxide of 125 to 150.

Oxirane, 2,2'-{(1-Methylidene)bis{4,1-phenyleneoxy{1,-butoxymethyl)-2,1-ethandiyl)oxymethylene}}bis- is the preferred chain extended epoxide resin of the present invention. It is within the contemplation of the present invention that other chain extended epoxide resins that possess the following properties would be usable: an epoxide equivalent weight of between 275 to 375, s viscosity range of 750 to 1250 cps and a Gardner color of 1 max.

Phenol, 4,4'-(1-methylethylidene) with (chloromethyl) oxirane is the preferred epoxide resin of the present invention. However, it is within the contemplation of the present invention that additional epoxide resins that possess the following properties would be usable: an equivalent epoxide weight of 176–192, a viscosity range of 6,500 to 9,500 and a color that is light to transparent in appearance.

The preferred anhydride curing agent is methyl hexahydro phthalic anhydride. Examples of additional anhydride curing agents that are usable either singly or as blends are methyl tetrahydro phthalic anhydride (MTHPA). and nadic methyl anhydride (NMA).

The preferred accelerating agent in the present invention is the imidazole accelerator, 2-ethyl-4-methylimidazole. An example of an additional usable accelerating agent would be alkyl acrylate polymer containing 2-ethyl-4-methyl imidazole. Another example would be molecular sieves containing the composition, 2-ethyl-4-methyl imidazole.

The preferred coupling agent or substrate adhesion promoter of the present invention is dineopentyl(dially)oxy, diparamino benzoyl zirconate. Examples of additional usable coupling agents or substrate adhesion promoters would be zirconate and titanate coupling agents as identified in the reference manual, KEN-REACT, published by Kenrich Petrochemicals, Inc., Second Revised Edition, published 1993.

The thus obtained extremely low viscosity matrix epoxy suffusion resin system in accordance with the present invention is primarily, but not exclusively, for use in aircraft and spacecraft quality resin applications, particularly fiber-reinforced fabrication applications.

A conventional carbon fiber-reinforced epoxy resin structure is light in weight and high in the mechanical strength and modulus of elasticity. It, therefore, is important as material used in the manufacture of light weight and strong composite structures for commercial and military aircraft. However, conventional carbon fiber-reinforced epoxy resins have several major disadvantages associated with them when utilized in the process of manufacturing state-of-the-art aircraft and related aerospace systems.

Conventional carbon fiber reinforced low viscosity liquid epoxy resin systems are difficult to work with since they must be freshly constituted before each use. What this implies is that before the resin may be utilized its component parts must be utilized within a relatively short period of time, usually following the constituting step. This requirement for constitution before each use, combined with the short working life and shelf life associated with constituted resin systems leads to significantly increased waste, particularly with regard to time requirements and money. In order to correct these problems a need has existed for a single component pre-catalyzed resin system that has an extended working life as well as an extended shelf life.

In order for any resin system to effectively address these concerns and disadvantages it must be capable of addressing the problems related to exotherm, mechanical, chemical and physical properties as well as processing and labor time requirements. Under these circumstances, the epoxy resin system of the present invention can solve these problems. That is, the composite materials prepared by reinforcing the present epoxy resin system with carbon fibers or other reinforcements have excellent impact resistance and require a large energy for rupture spread. Particularly, the composite materials prepared using carbon fiber or other reinforcements are excellent in tensile elongation and as a result ( Ref. Table IV) exhibit high tensile strength.

Additionally, the simplified application and processing time, i.e., one component pre-catalyzed resin system, and procedures no longer required because of the greatly enhanced stability, i.e., work life and shelf life of the present invention, make the use of the present invention more cost effective than existing conventional resin systems.

The following examples are for the purpose of illustration and are not to be construed as limiting the present invention in a manner inconsistent with the claims appended to this specification.

EXAMPLE 1

The numerical steps that follow are intended to point out the specific sequences and methods utilized to formulate the low viscosity matrix epoxy suffusion resin system of the present invention, as illustrated in Table. For clarity, each formula ingredient's generic name is listed first, followed by it's chemical name.

1. The polymeric resin, bisphenol A/novolac epoxy resin, is generally combined with the cycloaliphatic epoxide, vinyl cyclohexene dioxide, and slowly agitated until dissolved, creating a multifunctional cyclopolymeric epoxide resin. No outside heat is required or generated by the process.
2. The aromatic polyepoxide resin, methylene bis (O-ethylaniline) tetraglycidyl ether, is combined with the multifunctional cyclopolymeric epoxide resin under slow agitation until a thoroughly mixed resin blend results.
3. The chain extended epoxide resin, Oxirane, 2,2'-{1-methylethylidene) bis (4,1-phenylenoxy1-butoxymethyl)-2,1-ethanediyl}oxymethylene}} bis, combined with the product of step 2 under slow agitation until a thoroughly mixed resin blend results.
4. The epoxide resin, phenol, 4,4'-(1-methylethylidene) bis-, polymer with (chloromethyl) Oxirane, is combined with the product of the previous step under slow agitation until a thoroughly mixed blend results.
5. To the product of step 4 is added an anhydride curing agent, methyl hexahydro plithalic anhydride. under slow agitation until again thoroughly mixed.
6. To step 5 is added an imidazole accelerating agent, 2-ethyl-4-methyl imidazole, under slow agitation until thoroughly mixed.
7. To step 6 is then added a coupling agent or substrate adhesion promoter, dineopentyl(dially)oxy, diparamino benzoyl zirconate, under slow agitation until thoroughly mixed yielding the present invention, an extremely low viscosity matrix epoxy suffusion resin system.

EXAMPLE 2

1. The procedural steps detailed in Example 1 are repeated but with the following applicational parameters:
(A) A suffusion resin composition having a theoretical epoxide equivalent weight in the range of 150 to 350, and an anhydride curing agent, or curing agent blend, having an approximate anhydride equivalent weight of 120 to 350 are combined in a mix ratio of about 100 parts by weight of said resin composition with about 45 to 140 parts by weight of said curing agent to which has been added about 0.001 to 6.5 parts by weight of an imidazole accelerator and about 0.001 to 0.004 parts by weight of a coupling agent (also known as a substrate adhesion promoter), the resulting suffusion resin system has a viscosity of between about 50 cps and about 500 cps at 22° C., Ref. Table I.

EXAMPLE 3

The extremely low viscosity matrix epoxy suffusion resin system of this invention has been employed successfully to fabricate low cost, high quality fibrous structures that clearly demonstrate superior (ref. table IV) mechanical properties. Composite structures utilizing the epoxy resin suffusion system of this invention maybe fabricated as follows:

A. A mold capable of producing the required shaped item is selected. The mold may be complex in shape, such as concave or convex with precision engineered contours and elevations, for the general resin suffusion procedure described herein. For the purpose of an abbreviated explanation as to how the invention may be utilized by industry, a laminate constructed of 10 each 0.010" per ply of woven carbon fiber fabric has been selected.

B. A release media such as a parting wax is applied to the mold to prevent the cured composite from bonding to the mold surface. General instructions are as follows:

C. Place fibrous composite preform on mold surface.
D. Attach a vacuum bagging film to the mold surface that will establish a resin inlet port and a vacuum outlet port and assure the maintenance of vacuum during processing and cure.
E. Draw a vacuum on the opposite end of the dry composite preform lay up from the resin inlet port.
F. Vacuum suffuse the resin of this invention through the inlet port.
G. When the fibrous composite preform is wetted, close inlet valve and continue vacuum.
H. Cure impregnated preform in oven while maintaining vacuum. Preliminary temperature should be $_{125}°$ F. for about 12 hours, or 150° F. for 4 to 6 hours.
I. Cool laminate to room temperature and remove from mold.
J. Subject laminate to the following free standing post cure for about 30 minutes at 200° F., 30 minutes at 250° F., 30 minutes at 300°, hour at 350° F. and 4 hours at 400° F.

The extremely simple method of production or other methods of similar simplicity have been used to fabricate low cost fibrous composite structures that demonstrate aircraft quality properties (Ref. table IV ) when utilizing the extremely low viscosity matrix epoxy suffusion resin system of this invention.

EXAMPLE 4

Another abbreviated description of a simplified method of utilizing the product of this invention that demonstrates low cost construction of aircraft quality composite structures as follows (Ref. Table IV):

ENGINEERING TEST PANEL CONSTRUCTION (1) Prepare tool, clean and release
(2) Lay up 10 plies of fabric
(3) Vacuum bag lay up
(4) Prepare resin
(5) Vacuum suffuse
(6) Terminate suffusion
(7) Maintain vacuum
(8) Cure
(9) Cool
(10) Post cure
(11) Inspect.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

TABLE I

Viscosity and epoxide equivalent weight (EEW) of selected quantities of A Polymeric epoxy resin (a solid epoxy resin) diluted in 100 parts by weight of a cycloaliphatic epoxide.

| Mix No. | PBW EPOXY* | Solubility | Viscosity cps @ 25° C. | EEW WGT. | Notes |
|---|---|---|---|---|---|
| 1 | 10 | ok | 11 | 77 | # 1 through 9 |
| 2 | 20 | ok | 20 | 81 | room temperature soluble with |
| 3 | 35 | ok | 45 | 87 | minor stirring |
| 4 | 40 | ok | 68 | 89 | |
| 5 | 45 | rm. tmp. | 90 | 91 | |
| 6 | 50 | ok | 119 | 93 | |
| 7 | 55 | ok | 145 | 95 | |
| 8 | 60 | ok | 192 | 97 | |
| 9 | 55 | ok | 228 | 98 | |
| 10 | 80 | 125° F. | 750 | 103 | # 10 through # 17 require |
| 11 | 90 | 125° F. | 470 | 106 | moderace stirring at room |
| 12 | 100 | 125° F. | 750 | 109 | temperature. Solutions headed |
| 13 | 110 | 125° F. | 1125 | 112 | to 125° F. expedites the air |
| 14 | 115 | 125° F. | 1422 | 113 | release. |
| 15 | 125 | 125° F. | 2119 | 116 | |
| 16 | 135 | 125° F. | 3035 | 118 | |
| 17 | 140 | 125° F. | 3590 | 119 | # 18 through # 26 require |
| 18 | 150 | 175° F. | 5170 | 122 | constant stiring and heat as |
| 19 | 160 | 175° F. | 8100 | 124 | indicated. All held at |
| 20 | 170 | 175° F. | — | 126 | temperature until free of |
| 21 | 180 | 175° F. | — | 128 | trapped air. |
| 22 | 190 | 175° F. | — | 130 | |
| 23 | 200 | 175° F. | — | 131 | |
| 24 | 400 | 225° F. | — | 158 | |
| 25 | 600 | 225° F. | — | 173 | |
| 26 | 800 | 225° F. | — | 182 | |

*POLYMBRIC EPOXY RESIN

TABLE II

VERY LOW VISCOSITY MATRIX EPOXY SUFFUSION RESIN SYSTEM FORMULA

| COMMON NAME | SPECIFIC CHEMICAL NAME | WORKING RANGE PARTS BY WEIGHT |
|---|---|---|
| DIEPOXIDE | CYCLOALPHATIC EPOXIDE | 5–80 |
| POLYMERIC EPOXY RESIN | BISPHENOL A/NOVOLAC EPOXY RESIN | 2–45 |
| AROMATIC POLY EPOXIDE | METHYLENE BIS(O-ETHYLANILINE) TETRAGLYCIDYL ETHER | 5–30 |
| CHAIN EXTENDED EPOXIDE RESIN | OXIRANE, 2,2'-{(1-METHYLETHYLIDENE)BIS{4, 1-PHENYLENEOXY{1-(BUTOXYMETHYL)-2, 1-ETHANEDIYL}OXYMETHYLENE}}BIS- | 2–20 |
| EPOXIDE RESIN | PHENOL, 4,4'-(1-METHYLETHYLIDENE) BIS-, POLYMER WITH (CHLOROMETHYL) OXIRANE | 15–60 |
| ANHYDRIDE | METHYL HEXAHYDRO PHTHALIC ANHYDIRIDE | 35–180 |
| IMIDIZOL | 2-ETHYL-4-METHYLIMIDAZOLE | 0.001–0.6 |
| NEOALKOXY | DINEOPENTYL(DIALLY)OXY, DIPARAMINO BENZOYL ZIRCONATE | 0.001–0.2 |

TABLE IV

"SUFFUSION RESIN" PROPERTIES
PHYSICAL PROPERTIES - NEAT RESIN

| PROPERTY | VALUE |
|---|---|
| Viscosity @ 25° C., cps | <200 |
| Specific Gravity | 1.2 |
| Flash Point. ccc - ° C. | >94 |
| Vapor Pressure @ 20° C., mm Hg | 0.1 |
| Boiling Point @ 760 mm Hg ° C. | >200 |
| Color 1933 Gardner, Max | 2 |
| Freezing Point ° C. | .50 |

MECHANICAL PROPERTIES - NEAT RESIN

| PROPERTY | VALUE |
|---|---|
| Flexural - Ultimate, psi | 18,500 |
| Flexural Modulus | 0.480 |
| Tensile - Ultimate, psi | 10,300 |
| Tensile Modulus | 0.440 |
| Compression - Ultimate, psi | 17,930 |

TABLE IV-continued

| | | |
|---|---|---|
| Compression - Molulus | | 0.521 |
| Tg, ° F., DSC, Dry | | >350 |
| Hardnsss, shore D | | >86 |
| Glass Transition, Tg, ° F., DMA, Wet | | >300 |

MECHANDCAL PROPERTIES OF CARBON LAMINATE 6K, 5H, AS4, WOVEN FABRIC

| PROPERTY | TEST METHOD | VALUE |
|---|---|---|
| Tensile, Ultimate | ASTM D838 | 111,500 |
| Tensile Modulus | ASTM D83B | 10.5 |
| Compression, Ultimate | ASTM D695 | 88,450 |
| Compression Modulus | ASTM D695 | 12.0 |
| Flexural, Ultimate | ASTM D790 | 92,725 |
| Flexural Modulus | ASTM D790 | 5.32 |
| Fracture Toughness | (GIIc) | 9 in. lb/in$^2$ |

NOTES:
Fiber Volume, Actual 52%
Mechanical data fiber volume Fraction normlized to 60%

MECHANICAL PROPERTIES OF UNI-DIRECTIONAL 6K, AS4 CARBON FIBER LAMINATE

| PROPERTY | TEST METHOD | VALUE |
|---|---|---|
| Tensile, Ultimate, psi | ASTM D3039 | 259,495 |
| Tensile Modulus, psi | ASTM D3039 | 20.25 |
| Compression, Ultimate | ASTM D695 | 123,750 |
| Compression, msi | ASTM D695 | 14.35 |
| Flexural, Ultiumate, psi* | ASTM D790 | 170,950 |
| Flexural Modulus, psi | ASTM D790 | 16.22 |

NOTE:
NO ILS SPECIMENS WERE TAKE FROM THIS PANEL DUE TO THE HEAVY STITCHING USED TO HOLD THE UNIDIRECTIDNAL 16K CARBON STRANDS IN PLACE.
*REVISED TO INCLUDE FLEXURAL PROPERTIES, 11.18.97, pgp

What is claimed:

1. An extremely low viscosity matrix epoxy suffusion resin system, comprising:

a) a suffusion resin composition comprising a polymeric epoxy resin a cycloaliphatic diepoxide, an aromatic poly epoxide, a chain extended epoxide resin and an epoxide resin said composition having a theoretical epoxide equivalent weight in the range of about 150 to about 350 and an anhydride curing agent having an approximate anhydride equivalent weight of about 120 to about 350, said resin composition combined with said curing agent in a mix ratio of about 100 parts by weight of said resin composition with about 45 to about 140 parts by weight of said curing agent to which has been added about 0.001 to about 6.5% parts by weight of an accelerator and about 0.001 to about 0.02 parts by weight of a substrate adhesion promoting agent, wherein said suffusion resin system has a viscosity of between about 50 cps and about 500 cps at 22 degrees C.

2. The resin composition of claim 1 wherein said polymeric expoxy resin is bisphenol A/novolac epoxy resin.

3. The resin composition of claim 1 wherein said cycloaliphatic diepoxide is vinyl cyclohexene dioxide.

4. The resin composition of claim 1 wherein said aromatic poly epoxide is methylene bis (o-ethylaniline) tetraglycidyl ether.

5. The resin composition of claim 1 wherein said chain extended epoxide resin is oxirane, 2,2'{1-methylethylidene) bis {4,1-phenylenoxy{1-(butoxymethyl)-2,1-ethanediyl} oxymethylene}}bis.

6. The resin system of claim 1 wherein said epoxide resin is phenol, 4,4-(1-methylethylidene) bis, polymer with (chloromethyl) oxirane.

7. The resin system of claim 1 wherein said curing agent is selected from the group consisting of methyl hexahydro phthalic anhydride, methyl tetrahydro phthalic anhydride or nadic methyl anhydride.

8. The resin system of claim I wherein said accelerator is 2-ethyl-4-methyl imidizol.

9. The resin of claim 1 wherein said substrate adhesion promoter is dineopentyl (dially) oxy, diparamino benzoyl zirconate.

10. The resin system of claim 1 wherein said polymeric epoxy resin is a multi functional solid epoxy resin with a melt point of 90 to 100 degrees C with an equivalent weight per epoxide of about 225 with at least eight reactive sites per molecule.

11. The resin system of claim 1 wherein said cycloaliphatic diepoxide is vinyl cyclohexene dioxide having a viscosity between 8 and 50 cps and a weight per epoxide of 65 to 85.

12. The resin system of claim 2 wherein said aromatic poly epoxide is a tetra-functional epoxy resin with a viscosity of between about 8,000 to about 10,000 cps and a weight per epoxide of about 125 to about 150.

13. The resin system of claim 1 wherein said epoxide resin has an epoxide equivalent weight in the range of about 176 to about 192 and a viscosity range of about 6,500 to about 9500 cps and a color that is light to transparent.

14. A method for producing an extremely low viscosity matrix epoxy suffusion resin system which comprises the steps of:

(a) combining between 2 to 45 parts by weight of a polymeric epoxide resin with between 5 to 80 parts by weight of a cycloaliphatic epoxide resin with sufficient agitation to form a cyclopolymeric epoxide resin mixture, (b) combining between 5 to 30 parts by weight of an aromatic poly epoxide resin with said cyclopolymeric epoxide resin mixture under slow agitation to obtain a thoroughly mixed resin mixture, (c) combining under slow agitation between 2 to 20 parts by weight of a chain extended epoxide resin to the thoroughly mixed resin system which is the product of (b) until a thoroughly mixed resin mixture is obtained, (d) combining between 15 to 60 parts by weight of an epoxide resin under slow agitation to the thoroughly mixed resin mixture which is the product of (c) until a thoroughly mixed resin mixture is obtained, e) combining between 35 to 180 parts by weight of an anhydride curing agent to the thoroughly mixed resin mixture which is the product of (d) until a thoroughly mixed resin mixture is obtained, (f) combining between 0.001 to 6.5% parts by weight of the imidazole accelerator to the thoroughly mixed resin mixture which is the product of (e) until a thoroughly mixed resin mixture is obtained, (g) combining under slow agitation between about 0.001 to about 0.04 parts by weight of a substrate adhesion promoting agent to the thoroughly mixed resin mixture which is the product of (f) until a thoroughly mixed suffusion resin system is obtained.

15. The method of claim 14 wherein said polymeric epoxide resin is bisphenol A/Novolac epoxy resin.

16. The method of claim 14 wherein said cycloaliphatic epoxide resin is vinyl cyclohexene dioxide.

17. The method of claim 14 wherein said aromatic epoxide resin is methylene bis (O-ethylaniline) tetraglycidyl ether.

18. The method of claim 14 wherein said chain extended epoxide resin is oxirane, 2'2-{(1-methylethylidene)bis {4,1-phenyleneoxy{1-butoxymethyl)-2,1-ethanediyl} oxymethylene}} bis.

19. The method of claim 14 wherein said epoxide resin is phenol 4,4'-(1-methylidene) bis-polymer with (chloromethyl) oxirane.

20. The method of claim 14 wherein said anhydride curing agent is selected from the group consisting of methyl hexahydrophthalic anhydride, methylteyra hexahydrophthalic anhydride or nadic methyl anhydride.

21. The method of claim 14 wherein said imidizol accelerator is 2-ethyl-4-methyl imidizol.

22. The method of claim 14 wherein said substrate adhesion promoter is dieneopentyl (dially) oxy, diparamino benzoyl zirconate.

23. A process for fabricating a high quality and low cost fibrous structure utilizing the extremely low viscosity matrix suffusion resin system of claim 1 comprising the steps of:

a mold capable of producing the required shaped item is selected, a release media such is applied to the mold, a composite preform is placed on the mold covering the release media forming a lay up, a film is attached to the mold, a vacuum is drawn on the lay up, the resin system of claim 1 is vacuum suffused into the composite preform, the composite preform is cured in an oven while maintaining vacuum at a preliminary temperature of 125 degrees F. for about 12 hours, the composite preform is cooled to room temperature and removed from the mold, post cure for about 30 minutes at about 200 degrees F.

\* \* \* \* \*